L. Thorn,
Steam-Boiler Indicator.
Nº 20,380. Patented May 25, 1858.
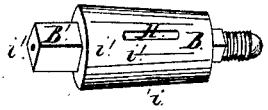
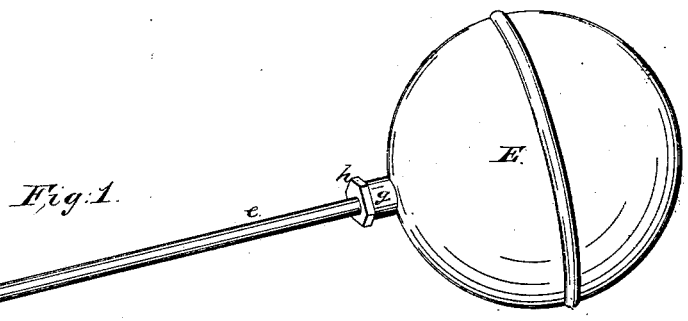
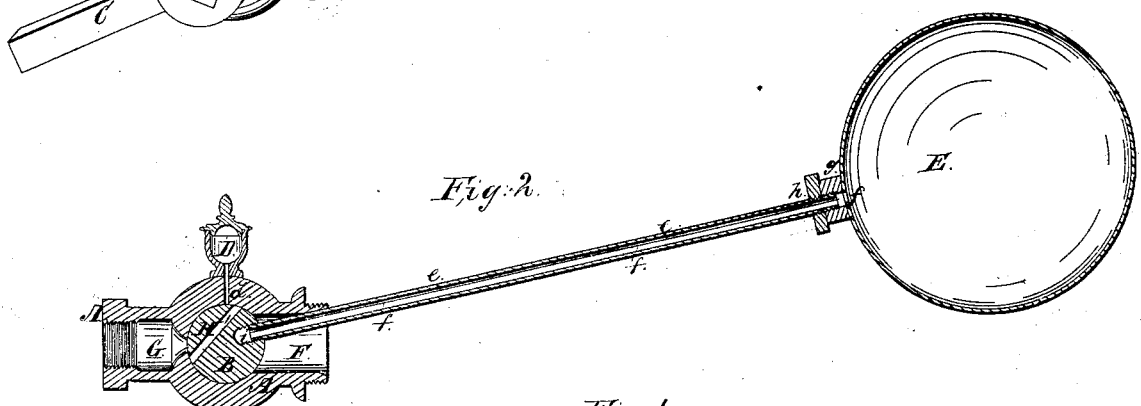
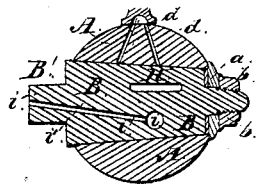

UNITED STATES PATENT OFFICE.

L. THORN, OF NEW YORK, N. Y.

STEAM-BOILER.

Specification of Letters Patent No. 20,380, dated May 25, 1858.

*To all whom it may concern:*

Be it known that I, LEONARD THORN, of the city, county, and State of New York, have invented a new and useful Improvement in Feed-Regulators for Steam-Boilers; and I do hereby declare that the following is a full, clear, and exact description of the same, reference being had to the accompanying drawings, forming part of this specification, in which—

Figure 1, is a perspective view of a feed regulator with my improvement. Fig. 2, is a longitudinal section of the same. Fig. 3, is a perspective view of the plug of the regulating cock, detached. Fig. 4, is a section of the cock taken through the center of the plug.

Similar letters of reference indicate corresponding parts in the several figures.

The kind of regulator to which my invention relates consists of a cock in the feed pipe at or near its junction with the boiler, and an attached float resting on the surface of the water in the boiler and operating to open and close the passage through the cock as the level of the water in the boiler varies, for the purpose of admitting or shutting off the supply of water. The cock and float constitute the whole apparatus for feeding a boiler for generating steam for heating purposes of so low a pressure that the pressure of water in the supply pipes of cities or of the head in an elevated reservoir, is sufficient to force in the water, but when the water has to be pumped into the boiler I generally attach a lever to the cock to start the feed pump when more water is required in the boiler.

My invention consists in the peculiar manner of combining the float with the cock hereinafter described, whereby the regulator is made of simple construction and rendered very efficient.

To enable others to make and use my invention I will proceed to describe its construction and operation.

A, is the external portion of a cock of ordinary construction having a nozzle F, at one end on which is cut a screw thread to screw into a hole in the boiler or to receive a nut on the inside thereof and in the other end G, of which is cut a female screw to receive the end of the feed pipe.

B, is the plug of the cock which is held in place by a washer $a$, and nut $b$, in the usual manner. The passage H, of the plug $b$ is made a little out of the center of the plug as shown in Fig. 4, in order to attach the stem or arm $e$, of the hollow metal float G, directly to the plug in such a manner as to permit it to pass through the nozzle F, which mode of attaching the said stem or arm constitutes an important feature of my invention. The said stem or arm $e$, is made of a piece of tube and screwed into a hole $i$, that is drilled and tapped in the plug, and the interior of the said tube constitutes a passage $f$, which forms a continuation of a passage $i'$, $i'$, drilled longitudinally of the plug from one end thereof to the hole $i$, the said passage $f$, hole $i$, and passage $i'$, forming a communication from the interior of the float through the plug of the cock to the atmosphere.

D, is an oil cup screwed into the top of the external portion A, of the cock to supply oil to the plug through two holes $d$, $d$.

C, is a lever fitted to a square head B', of the plug and intended to connect with any suitable contrivance that is capable of starting and stopping the action of a feed pump through the motion of the said lever produced by the action of the float on the cock. In feed regulators attached to boilers supplied by a natural head of water, this lever will be unnecessary, as the opening and closing of the cock that is produced by the descent or ascent of the float as the water falls below or rises above a certain level will be sufficient to regulate the supply.

The attachment of the stem or arm of the float to work through the nozzle F, of the cock simplifies the construction of the regulator and provides for its repair as it permits the use of a simple cock applied outside of the boiler.

The making of a passage from the interior of the hollow metal float and through the stem or arm thereof and through the plug of the cock provides for the escape of the atmosphere by evaporation, of any water that may find its way into the interior of the float, and thus preserves the efficiency of the float.

I do not claim to have invented the combination of a cock and float to regulate the supply of water to a boiler, but

What I claim as my invention and desire to secure by Letters Patent, is—

Making the stem or arm of a hollow float which is applied to the cock in the manner herein described, with a passage through it connecting with a passage leading through one end of the plug of the cock and thereby forming a communication from the interior of the float to the atmosphere for the purpose herein set forth.

LEONARD THORN.

Witnesses:
HENRY T. BROWN,
A. R. HOYTT.